United States Patent [19]

Siddiq

[11] Patent Number: 4,664,947

[45] Date of Patent: May 12, 1987

[54] MULTI-LAYER PROCESS FOR COBALT TREATMENT OF FERROMAGNETIC OXIDES

[75] Inventor: Mohammed Siddiq, San Jose, Calif.

[73] Assignee: Tandy Corporation, Fort Worth, Tex.

[21] Appl. No.: 618,865

[22] Filed: Jun. 8, 1984

[51] Int. Cl.$^4$ ............................................... B05D 5/12
[52] U.S. Cl. .................................... 427/130; 427/131; 427/132
[58] Field of Search ................................ 427/127–132, 427/48

[56] References Cited

FOREIGN PATENT DOCUMENTS 0092394 10/1983 European Pat. Off. .

Primary Examiner—Bernard D. Pianalto
Attorney, Agent, or Firm—Townsend & Townsend

[57] ABSTRACT

Coercivity of ferromagnetic particles is increased by depositing multiple layrs containing transition metals, including cobalt, on the surface of the particles at ambient temperature. Thereafter, the particles are heated sufficiently to obtain the desired level of coercivity. Typically, total heating time is five to ten hours.

12 Claims, No Drawings

MULTI-LAYER PROCESS FOR COBALT TREATMENT OF FERROMAGNETIC OXIDES

FIELD OF THE INVENTION

This invention relates to the treatment of ferromagnetic particles to improve their performance when used in the manufacture of magnetic recording media. More particularly, the invention improves upon the process for such treatment in which multiple surface layers containing transition metals including cobalt are deposited on the particles by shortening the total processing time.

BACKGROUND OF THE INVENTION

Copending U.S. Pat. application Ser. No. 369,628 filed April 19, 1982, discloses an improved process for converting low performance ferromagnetic oxides to high performance ferromagnetic oxides. In that process a plurality of layers each containing a transition metal are deposited on the surface of the particles. One preferred embodiment includes three such layers in which the first and third layers contain cobalt and the intermediate second layer contains ferrous iron. The layers are precipitated in sequence onto the particles from an aqueous solution. As each layer is deposited the solution is heated for an extended period of time and then cooled before the second layer is deposited. The heating and cooling steps are then repeated and thereafter the third layer is deposited, heated and cooled.

The total sequence of steps in the referenced process consumes a substantial period of time. For example, using the three layer structure as typical, the first layer is heated for three hours at 100° C and then cooled to room temperature. The slurry forming the second layer is heated to 100° C. for sixteen hours and then cooled. Then the slurry containing the third layer materials is heated to 100° C. for three hours and cooled. Thus, the heating time alone consumes about twenty-two hours.

While the prior process is effective and produces ferromagnetic particles having the desired properties, the process is disadvantageous from a practical commercial standpoint because of the time involved. The present invention is designed to provide comparable ferromagnetic particles having improved properties for magnetic recording, particularly with respect to increased coercivity, by depositing multiple layers containing transition metals but does so in a very much shortened period of time. The present process is thereby more useful from a commercial point of view.

SUMMARY OF THE INVENTION

In accordance with the present invention there is provided an improved method for increasing coercivity of ferromagnetic particles by depositing multiple layers containing transition metals on the surface of the particles. The method is practiced by sequentially depositing each of the multiple layers onto the particles at ambient temperature. Following deposit of all layers, the coated particles are heated for the first time sufficiently to obtain the desired level of coercivity. Coercivity on the order of 600 Oersteds ("Oe") or more within processing times of less than about ten hours is readily obtainable. This is accomplished while retaining the highly efficient cobalt utilization of the above cited copending application.

DESCRIPTION OF THE PREFERRED EMBODIMENT

The preferred core or precursor material utilized is usually gamma ferric oxide ($\gamma$-$Fe_2O_3$) or $Fe_3O_4$ or the intermediate or pretreated forms thereof. Processing of the selected iron oxide is executed in an aqueous slurry media. Multiple layers containing transition metals are deposited on the surface of the particles from the aqueous slurry. In the usual case cobalt is desired in at least one of the surface coatings, and therefor a cobalt salt is added to the aqueous media. In the preferred embodiment the first layer coated on the particles contains cobalt, and the next layer will generally be a different transition metal such as manganese, nickel or zinc. Preferably, ferrous iron is introduced into the second layer. The invention contemplates the use of mixtures of transition metals as well as the pure metals. In the preferred embodiment which utilizes three layers on the particles, the third layer will again contain cobalt.

Each layer is deposited onto the particles by precipitation from the aqueous slurry. The reaction is executed at ambient temperature. In the preferred three layer process, the first layer is deposited by mixing the selected metal salt at an initial pH of about 6–7 and precipitated with added base. Similarly, the second layer is commenced at an initial pH of about 6–7 followed by base precipitation, and the third layer formation commenced at an initial pH of about 6.5–7.5 and base precipitated. While the process could be practiced outside of these ranges, the ranges are preferred for efficiency in forming the layers and insuring completeness of precipitation of the desired transition metal in each layer.

The amounts of transition metals to be included in each layer is consistent with the above referenced prior application. In general, the preferred embodiment seeks to saturate the particle surface with the layer being deposited. In the case where the first layer contains cobalt, sufficient cobalt salt is utilized to provide an amount of cobalt in the first layer of about 1-2% by weight of the precursor such as $\gamma$-$Fe_2O_3$. Total cobalt in the first and third layer where a three layer coated particle is desired will usually contain about 2.5–5.5 weight percent of core particle. The intermediate iron containing layer will usually utilize sufficient ferrous salt to deposit an amount of iron which will result in a molar ratio of cobalt to ferrous iron in the layers of about 0.4.

Where reference is made herein to a transition "metal" in each layer, it should be understood that the chemical state of the metal may be ionic as part of a precipitated reaction product such as an oxide or hydroxide and not as a zero valence state metal.

After the transition metal layers have been deposited on the particles at ambient temperature, the particles are prepared for heating. A substantial excess over stoichiometric requirements of base is added. For example, in the preferred embodiment sufficient base is added to impart about a 1,000 weight percent excess over the stoichiometric amount. Any base, preferably strong bases, which will contribute hydroxyl ions to the slurry such as potassium, sodium, or ammonium may be utilized. The use of a substantial excess of base is important in achieving the desired improved properties in the preferred embodiment in the shortest of processing times.

Heating conditions are comparable to that previously used. Generally temperatures of about 90°–100° C. are imparted to the aqueous slurry. Heating times are usually about five to ten hours at which time coercivity of the particles will have risen to at least about 600 Oe.

The following is a suggested protocol that may be followed to obtain the benefits of the invention.

A slurry is prepared by stirring or sonicating the selected iron oxide with water. The pH is adjusted as required. Nitrogen is introduced into the slurry at this point and throughout the reaction.

The selected transition metal such as a cobalt salt is dissolved in water and added to the iron oxide slurry. Base is added to precipitate the cobalt and the mixture stirred.

The pH of the suspension is adjusted with acid as required. A second metal such as ferrous iron is added as a salt in water to the suspension. Base is added to precipitate the iron as required and the mixture is stirred.

The pH is adjusted with acid as required. Cobalt salt is again dissolved in water and added to the slurry. A substantial excess of base is added which precipitates the cobalt and the slurry is heated to about 100° C. and maintained for five hours or more and then allowed to cool.

The above procedure yields three metal layers. Additional layers can be similarly added if desired before the final adjustment with excess base and heating is accomplished.

The coated metal oxide can then be separated from the aqueous media, rinsed and dried, and utilized in the manufacture of magnetic recording media of any type, including audio and video tape or magnetic disks which may be utilized for recording analog and digital information.

EXPERIMENTAL

The following work demonstrates the improved properties of ferromagnetic particles treated with the present process.

One hundred grams of $\gamma$-$Fe_2O_3$ particles having a surface area of 30 $m^2$/g and an initial powder coercivity of 340 Oe were utilized. The particles were dispersed in aqueous media at pH 6.0. Nitrogen gas was bubbled through the media.

First Layer —Co++ (1.5% by weight of core or precursor)

7.14 g $CoSo_4 \cdot 7H_2O$ was dissolved and added; pH was 5.2. 4.17 g 50% NaOH was added dropwise over a ten minute period; pH was 10.4. The slurry was stirred for one half hour; pH was 10.3. The pH was adjusted to 6.3 with $H_2SO_4$ diluted 1:4.

Second Layer —Fe++ (7% by weight of core or precursor) cursor)

35 g $FeSo_4 \cdot 7H_2O$ was dissolved and added; pH was 5.3. 20.5 g 50% NaOH was added dropwise over a ten minute period; pH was 10.2. The slurry was stirred for one hour; pH was 9.3. The pH was adjusted to 7.0 with $H_2SO_4$ diluted 1:4.

Third Layer —Second Co++ (1.5% by weight of core or precursor)

7.14 g $CoSo_4 \cdot 7H_2O$ was dissolved and added; pH was 6.9. 300 g 50% NaOH was added over a one-half hour period as heating was begun. Temperature was raised to 100° C. and maintained and samples were taken as heating progressed. Sample A was taken after one hour; sample B after three hours; sample C. after five hours; and sample D after ten hours. All samples were rinsed, filtered and dried in air at 60° C. The magnetic properties of the particles were determined in a vibrating sample magnetometer (VSM). The following summarizes the observed properties.

| Sample | Coercivity, Oe | Specific Saturation Magnetization, EMU/g. | Remanence Magnetization, EMU/g. | Squareness |
|---|---|---|---|---|
| A (1 hr) | 575 | 80.6 | 34.9 | .43 |
| B (3 hrs) | 586 | 80.9 | 35.2 | .44 |
| C (5 hrs) | 602 | 80.8 | 35.3 | .44 |
| D (10 hrs) | 601 | 80.7 | 35.1 | .43 |

I claim:

1. In the method for increasing coercivity of ferromagnetic particles by depositing multiple layers containing transition metals on the surface of the particles, the improvement comprising: depositing all of said layers on the particles at ambient temperature and then heating the particles sufficiently to obtain the desired level of coercivity, whereby overall processing time is reduced.

2. The improved method in accordance with claim 1, wherein a substantial excess of base is added before said heating of the particles.

3. The improved method in accordance with claim 2, wherein said base is added in about a one thousand weight percent excess over stoichiometric requirements.

4. The improved method in accordance with claim 2, wherein said heating is executed for a time sufficient to raise the coercivity of the particles to at least about 600 Oe.

5. The improved method in accordance with claim 4, wherein said heating is executed at a temperature of about 90–100° C. for about five to ten hours.

6. The improved method in accordance with claim 1, wherein at least two transition metal containing layers are deposited on said particles, one of which contains cobalt and another layer contains a different metal.

7. The improved method in accordance with claim 1, wherein said particles are coated with at least three layers, the first layer containing cobalt, the second layer containing iron, and the third layer containing cobalt.

8. The improved method in accordance with claims 1, 2, or 7 wherein said particles are $\gamma$-$Fe_2O_3$.

9. A method for converting low performance ferromagnetic oxide to high performance ferromagnetic oxide useful in making magnetic recording media comprising: (a) providing $\gamma$-$Fe_2O_3$ core particles; (b) suspending said core particles in an aqueous media; (c) adding a cobalt salt to said media at a pH of about 6–7 and forming a first surface layer on said particles at ambient temperature; (d) adding a ferric salt to said media at a pH of about 6–7 and forming a second layer on said core particles at ambient temperature; (e) adding a cobalt salt to said media at a pH of about 6.5–7.5 for forming a third layer on said core particles at ambient temperature; (f) adding a substantial stoichiometric excess of hydroxyl ion to said media and heating said media for a time sufficient to substantially increase the coercivity of said core particles.

10. A method in accordance with claim 9, wherein said heating is executed at about 90°–100° C. for a time sufficient to increase the coercivity of said particles to at least about 600 Oe.

11. A method in accordance with claim 9, wherein the amount of cobalt and iron salts added to said aqueous media in each of steps (c), (d) and (e) is sufficient to substantially saturate the core particle surface with the layer formed from each of said salts.

12. A method in accordance with claim 9, wherein each of said first, second and third layers is separately formed by precipitating the selected metal salt present with sufficient base.

* * * * *